United States Patent
Hata (10) Patent No.: US 10,475,237 B2
(45) Date of Patent: Nov. 12, 2019

(54) IMAGE PROCESSING APPARATUS AND CONTROL METHOD THEREOF

(71) Applicant: CANON KABUSHIKI KAISHA, Tokyo (JP)

(72) Inventor: Tetsuya Hata, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/315,412

(22) PCT Filed: Sep. 10, 2015

(86) PCT No.: PCT/JP2015/004604
§ 371 (c)(1),
(2) Date: Dec. 1, 2016

(87) PCT Pub. No.: WO2016/047072
PCT Pub. Date: Mar. 31, 2016

(65) Prior Publication Data
US 2017/0186222 A1 Jun. 29, 2017

(30) Foreign Application Priority Data

Sep. 26, 2014 (JP) .................. 2014-197506

(51) Int. Cl.
*G06T 15/50* (2011.01)
*H04N 5/232* (2006.01)
(Continued)

(52) U.S. Cl.
CPC ........ *G06T 15/506* (2013.01); *G06K 9/00228* (2013.01); *G06K 9/4661* (2013.01);
(Continued)

(58) Field of Classification Search
CPC .................. G06T 15/50; G06T 15/506; G06T 2207/30201; G06T 2215/16; G06T 15/60;
(Continued)

(56) References Cited

U.S. PATENT DOCUMENTS 6,873,712 B2  3/2005  Shibuya
8,265,417 B2  9/2012  Nakamura et al.
(Continued)

FOREIGN PATENT DOCUMENTS

CN    1692376 A    11/2005
CN  101470895 A     7/2009
(Continued)

OTHER PUBLICATIONS

International Search Report and Written Opinion in PCT/JP2015/004604, dated Nov. 24, 2015.
(Continued)

*Primary Examiner* — Xiao M Wu
*Assistant Examiner* — Scott E Sonners
(74) *Attorney, Agent, or Firm* — Venable LLP (57) ABSTRACT

Provided is an image processing apparatus that can flexibly control the position of a virtual light source used for re-lighting processing and correct shading of an object, and a control method thereof. A shading condition detection unit calculates an evaluation value representing the condition of the shading for an object region within an image. A virtual light source control unit then sets a virtual light source based on the evaluation value, and a virtual light addition unit applies the effects of virtual light irradiated by the virtual light source in the image.

20 Claims, 7 Drawing Sheets

(51) Int. Cl.
*H04N 5/262* (2006.01)
*G06T 5/00* (2006.01)
*G06K 9/00* (2006.01)
*G06K 9/46* (2006.01)
*G06T 15/80* (2011.01)

(52) U.S. Cl.
CPC .............. *G06T 5/008* (2013.01); *G06T 15/80* (2013.01); *H04N 5/23219* (2013.01); *H04N 5/23229* (2013.01); *H04N 5/2621* (2013.01)

(58) Field of Classification Search
CPC ........... G06T 15/80; G06T 5/008; G06T 5/00; G06T 7/507; G06T 7/514; G06T 7/70; G06K 9/00228; G06K 9/4661; G06K 9/2027; H04N 5/2351; H04N 5/2354; H04N 5/235
See application file for complete search history.

(56) References Cited

U.S. PATENT DOCUMENTS

| | | |
|---|---|---|
| 8,355,059 B2 | 1/2013 | Fukui |
| 8,659,624 B2 | 2/2014 | Matsui |
| 8,792,016 B2 | 7/2014 | Guan et al. |
| 9,007,486 B2 | 4/2015 | Fukui |
| 2002/0064299 A1 | 5/2002 | Shibuya |
| 2005/0174348 A1 | 8/2005 | Sakaguchi et al. |
| 2007/0273686 A1* | 11/2007 | Watanabe ............ G06T 15/506 345/419 |
| 2009/0103831 A1 | 4/2009 | Nakamura et al. |
| 2010/0134495 A1 | 6/2010 | Matsui |
| 2010/0201848 A1 | 8/2010 | Fukui |
| 2010/0302272 A1 | 12/2010 | Reid et al. |
| 2011/0002508 A1* | 1/2011 | Basso ..................... G06T 15/50 382/103 |
| 2011/0074782 A1 | 3/2011 | Hirotani et al. |
| 2011/0298946 A1 | 12/2011 | Guan et al. |
| 2011/0302272 A1* | 12/2011 | Tola .................... H04L 63/1408 709/217 |
| 2012/0002903 A1* | 1/2012 | Wilensky .................. G06T 5/00 382/311 |
| 2012/0314095 A1 | 12/2012 | Fukui |
| 2015/0042654 A1* | 2/2015 | Segasby .................. G06T 15/06 345/426 |
| 2015/0178550 A1* | 6/2015 | Hirashima .............. G06T 11/60 382/118 |
| 2015/0339817 A1 | 11/2015 | Kuriyama |

FOREIGN PATENT DOCUMENTS

| | | |
|---|---|---|
| CN | 101753814 A * | 6/2010 |
| CN | 101753814 A | 6/2010 |
| CN | 101800857 A | 8/2010 |
| CN | 102096916 A | 6/2011 |
| CN | 102326393 A | 1/2012 |
| JP | 2002-230550 A | 8/2002 |
| JP | 2008-009849 A | 1/2008 |
| JP | 2008-033897 A | 2/2008 |
| JP | 2010-128986 A | 6/2010 |
| JP | 2010-135996 A | 6/2010 |
| JP | 2013-235537 A | 11/2013 |
| JP | 2014-166298 A | 9/2014 |
| WO | 2010/095488 A1 | 8/2010 |

OTHER PUBLICATIONS

Apr. 6, 2018 European Search Report in European Patent Appln. No. 15844109.7.
Dec. 24, 2018 Chinese Official Action in Chinese Patent Appln. No. 201580035509.2.

* cited by examiner

IMAGE PROCESSING APPARATUS AND CONTROL METHOD THEREOF

TECHNICAL FIELD

The present invention relates to an image processing apparatus and a control method thereof, and particularly to a technique for correcting the brightness of an image.

BACKGROUND ART

Conventionally, a technique for correcting the brightness of a dark portion of an object in an image by applying a virtual light effect to the object is known (Japanese Patent Laid-Open No. 2010-135996). This makes it possible for the shading of the object generated by environment light to be adjusted after shooting.

Shading of an object depends on the three-dimensional shape of the object and the direction of the light illuminating the object. Moreover, the direction of the light illuminating the object depends on the relative positional relation between a virtual light source and the object. Therefore, in re-lighting processing for correcting the shading of the object using virtual light, it is necessary to appropriately determine the position of the virtual light source. However, in the technique described in Japanese Patent Laid-Open No. 2010-135996, the object is illuminated in an opposite direction to the environment light for the purpose of reducing the shade of the object, and therefore adjustment of the shading that can be realized with the re-lighting processing is restricted.

SUMMARY OF INVENTION

The present invention has been made in light of the problem with such a conventional technology, and provides an image processing apparatus that can correct the shading of an object by flexibly controlling the position of a virtual light source used for re-lighting processing, and a control method thereof.

According to an aspect of the present invention, there is provided an image processing apparatus comprising: calculation means for calculating an evaluation value representing a condition of shading for an object region in an image; setting means for setting a virtual light source based on the evaluation value; and correction means for applying effects of virtual light irradiated by the virtual light source in the image.

According to another aspect of the present invention, there is provided an image capturing apparatus comprising: the image processing apparatus according to the present invention; and image capturing means for acquiring the image by shooting.

According to a further aspect of the present invention, there is provided a method of controlling an image processing apparatus, comprising: a calculation step of calculating an evaluation value representing a condition of shading for an object region in an image; a setting step of setting a virtual light source based on the evaluation value; and a correction step of applying effects of virtual light irradiated by the virtual light source in the image.

According to a further aspect of the present invention, there is provided an image processing apparatus comprising: calculation means for calculating an evaluation value representing contrast of a region of interest in an image; acquisition means for acquiring a direction of radiation of environment light illuminating the region of interest in the image; setting means for setting a virtual light source, based on the evaluation value calculated by the calculation means and the direction of radiation of the environment light acquired by the acquisition means; and correction means for correcting the contrast of the region of interest in the image by applying illumination effects of the virtual light source in the region of interest in the image.

According to another aspect of the present invention, there is provided a method of controlling an image processing apparatus, comprising the steps of: calculating an evaluation value representing contrast of a region of interest in an image; acquiring a direction of radiation of environment light illuminating the region of interest in the image; setting a virtual light source based on the evaluation value calculated in the step of calculating and the direction of radiation of the environment light acquired in the step of acquiring; and correcting the contrast of the region of interest in the image by applying an illumination effect of the virtual light source in the region of interest in the image.

According to a further aspect of the present invention, there is provided a program for causing a computer to function as the image processing apparatus according to the present invention.

According to an aspect of the present invention, there is provided a computer-readable storage medium storing the program according to the present invention.

Further features of the present invention will become apparent from the following description of exemplary embodiments with reference to the attached drawings.

DESCRIPTION OF EMBODIMENTS

Exemplary embodiments of the present invention will now be described in detail in accordance with the accompanying drawings.

First Embodiment

Figure 1:
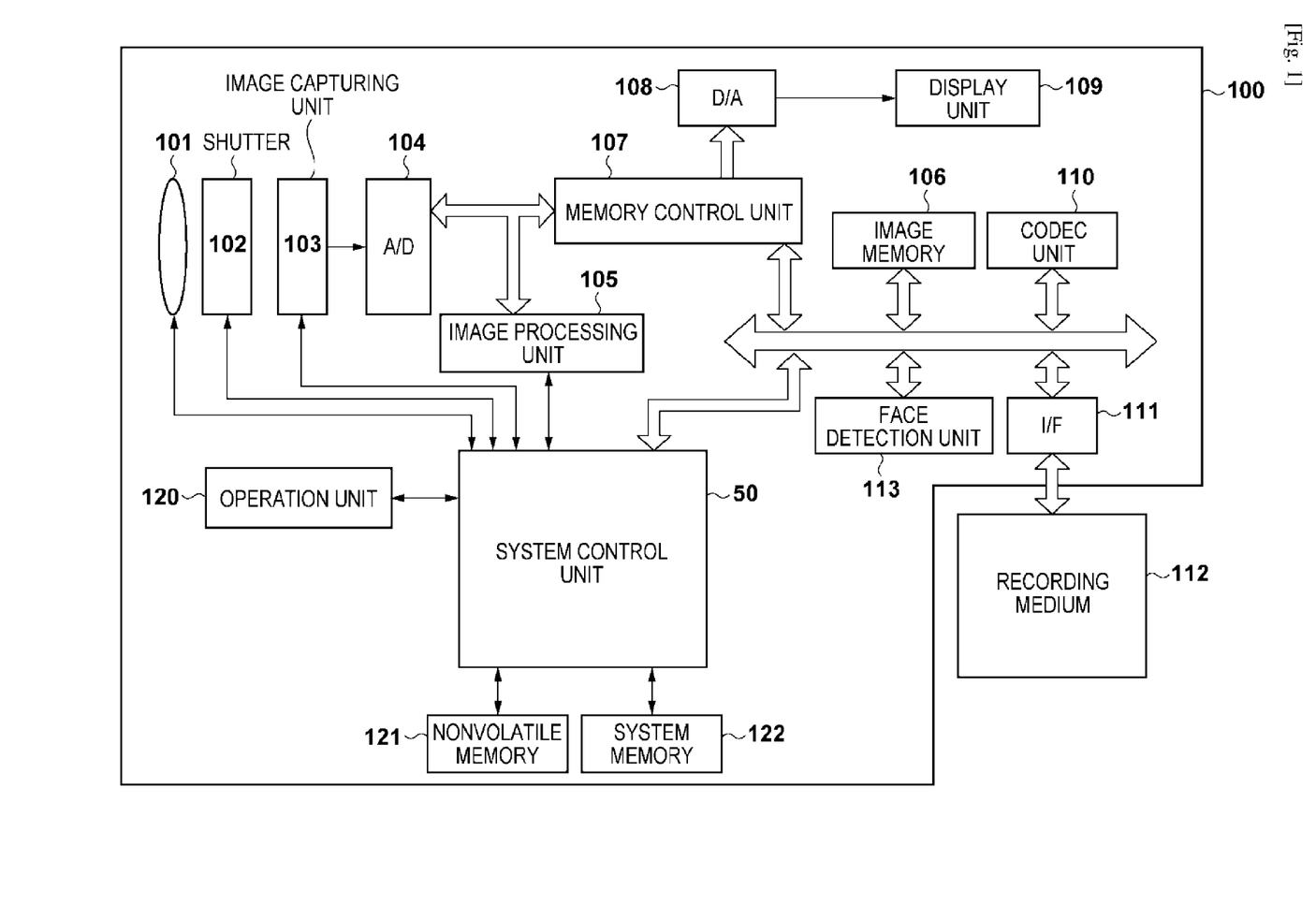
FIG. 1 is a block diagram showing the configuration of a digital camera in the present invention.

FIG. 1 is a block diagram showing an example of the configuration of a digital camera 100 as an example of an image processing apparatus according to the first embodiment of the present invention. The present invention is characterized by image processing which is applied to a shot image, and more specifically, by a method of re-lighting processing. Therefore, a configuration regarding shooting or recording is not necessary.

In FIG. 1, a lens group 101 is a zoom lens including a focus lens. A shutter 102 provided with a diaphragm function is provided between the lens group 101 and an image capturing unit 103. The image capturing unit 103 has an image sensor typified by a CCD or CMOS image sensor that converts an optical image formed on an image sensing plane by the lens group 101 into an electrical signal in units of pixels. An A/D converter 104 converts an analog signal output by the image capturing unit 103 into a digital signal (image data).

An image processing unit 105 performs various types of image processing such as color interpolation (de-mosaic), white balance adjustment, and gamma correction on the image data output from the A/D converter 104. The image processing unit 105 also performs re-lighting processing on a shot image. An image memory 106 temporarily stores image data. A memory control unit 107 controls writing/reading (of image data) to/from the image memory 106. A D/A converter 108 converts image data into an analog signal. A display unit 109 has a display apparatus such as an LCD or an organic EL display, and displays various GUIs, live view images, images read out from a recording medium 112 and reproduced, and the like. A codec unit 110 encodes image data stored in the image memory 106 with a predetermined method in order to record the image data to a recording medium, and decodes encoded image data included in an image file in order to display the image data, for example.

An interface (I/F) 111 mechanically and electrically connects a detachable recording medium 112 such as a semiconductor memory card or a card type hard disk, for example, to the digital camera 100. A system control unit 50 may be a programmable processor such as a CPU or an MPU, for example. The system control unit 50 realizes functions of the digital camera 100 by executing a program recorded in a nonvolatile memory 121 or a built-in nonvolatile memory so as to control required blocks and circuits, for example.

A face detection unit 113 detects face regions included in a shot image, and obtains face information such as position, size, and degree of reliability for each of the detected face regions. Note that the face detection unit 113 can detect the face regions using an arbitrary method such as a method using learning typified by a neural network, or a method for finding a characteristic site such as eyes, a nose, or a mouth in the image region using template matching and identifying a face if similarity is high.

An operation unit 120 collectively refers to input devices such as buttons and switches used by a user to input various instructions to the digital camera 100. In the case where the display unit 109 is a touch display, a touch panel is included in the operation unit 120. An input device of a type in which an instruction is input in a contactless manner such as voice input or eye-gaze input may also be included in the operation unit 120.

The nonvolatile memory 121 may be an EEPROM or the like that is electrically erasable and recordable, for example. The nonvolatile memory 121 stores various setting values and GUI data, as well as a program to be executed by the system control unit 50 in the case where the system control unit 50 is an MPU or a CPU.

A system memory 122 is used for expanding constants and variables for (use in) the operations of the system control unit 50, the program read out from the nonvolatile memory 121, or the like.

Next, the operations for shooting an image performed by the digital camera 100 will be described.

For example, the image capturing unit 103, using an image sensor, photoelectrically converts an object image formed on the image sensing plane by the lens group 101 while the shutter 102 is open, and outputs the image as an analog image signal to the A/D converter 104. The A/D converter 104 converts the analog image signal output from the image capturing unit 103 into a digital image signal (image data), and outputs the digital image signal to the image processing unit 105.

The image processing unit 105 performs various types of image processing such as synchronization processing (de-mosaic processing) and gamma correction on the image data from the A/D converter 104 or the image data from the memory control unit 107.

Moreover, in the image processing unit 105, predetermined calculation processing regarding luminance, contrast and the like is performed using image data obtained by shooting, and the system control unit 50 performs focus adjustment or exposure control based on the obtained calculation result. The detection result of the face detection unit 113 may be considered in focus detection or exposure control. In this manner, in the digital camera 100 of the present embodiment, AF (auto focus) processing and AE (automatic exposure) processing using a TTL (through the lens) method are performed. Furthermore, in the image processing unit 105, automatic white balancing (AWB) adjustment using the image data acquired while shooting is also performed.

Image data output from the image processing unit 105 is written to the image memory 106 via the memory control unit 107. The image memory 106 stores image data output from the image capturing unit 103 and image data to be displayed on the display unit 109.

Moreover, the D/A converter 108 converts data for image display stored in the image memory 106 into an analog signal and supplies the analog signal to the display unit 109. The display unit 109 performs display on a display apparatus such as the LCD, in accordance with the analog signal from the D/A converter 108.

The codec unit 110 encodes the image data stored in the image memory 106 based on a standard such as JPEG or MPEG. The system control unit 50 assigns a pre-defined header or the like to the encoded image data to form an image file, and records the data to the recording medium 112 via the interface 111.

Note that it is typical in current digital cameras that, in a shooting stand-by condition, moving image shooting is performed and shot moving images are continuously displayed on the display unit 109 to cause the display unit 109 to function as an electronic view finder (EVF). In this case, it is assumed that the shutter 102 is in an open condition and, for example, shooting at 30 frames/second is performed using a so-called electronic shutter of the image capturing unit 103.

Moreover, if a shutter button included in the operation unit 120 is half-pressed, the above-described AF control and AE control are performed, and if the button is fully pressed, actual shooting of a still image to be recorded is executed, and the still image is recorded to the recording medium 112. Moreover, in the case where shooting of a moving image is instructed using a moving image shooting button or the like, recording of the moving image to the recording medium 112 is started.

Figure 2:
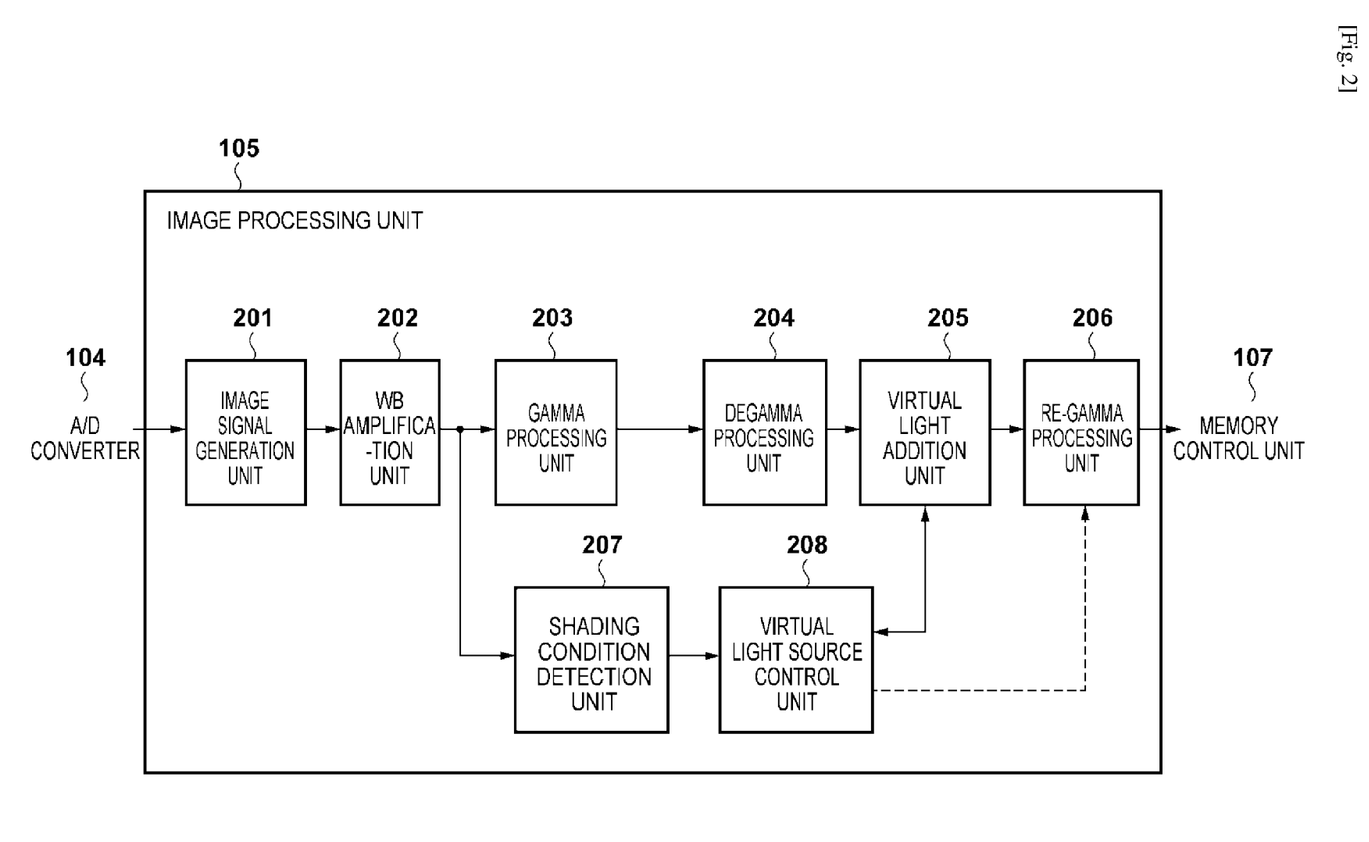
FIG. 2 is a block diagram showing the configuration of an image processing unit in the present invention.

FIG. 2 is a block diagram showing an example of the function configuration regarding the re-lighting processing of the image processing unit 105. Note that one or more of the function blocks shown in FIG. 2 may be realized by a combination of a microprocessor and software, or may be realized by hardware such as an ASIC (Application Specific Integrated Circuit) or a PLD (Programmable Logic Device). The PLD includes an FPGA (Field-Programmable Gate Array), a PLA (Programmable Logic Array) and the like.

Note that the re-lighting processing can be performed on:
an image shot in a condition where execution of the re-lighting processing has been designated, and
an image recorded to the recording medium 112 in which execution of the re-lighting processing has been instructed from a menu screen or the like, for example.

Note that it is assumed that information at the time of the shooting is read out from the nonvolatile memory 121 or the system memory 122, or obtained from the header of the image file or the like in the case where the information is required in the re-lighting processing.

The image processing unit 105 serving as a re-lighting processing unit has an image signal generation unit 201, a WB amplification unit 202, a gamma processing unit 203, a degamma processing unit 204, a virtual light addition unit 205, a re-gamma processing unit 206, a shading condition detection unit 207, and a virtual light source control unit 208.

The image signal input from the A/D converter 104 in FIG. 1 to the image processing unit 105 in FIG. 1 is input to the image signal generation unit 201. The image signal generation unit 201 performs synchronization processing (de-mosaic processing) on the image signal having information of one color (any one of R, G, and B) per pixel, and generates an image signal in which each pixel has information of three colors (RGB). The image signal generation unit 201 outputs the generated image signal to the WB amplification unit 202.

The WB amplification unit 202 calculates a white balance gain value from the image signal, and applies the white balance gain to the color components R, G, and B of the image signal. The WB amplification unit 202 outputs the image signal RGB after the white balance adjustment to the gamma processing unit 203 and the shading condition detection unit 207.

The shading condition detection unit 207 calculates an evaluation value that represents the condition of shading generated on an object region due to environment light illuminating the object at the time of shooting, based on the input image signal RGB. Moreover, the shading condition detection unit 207 detects the direction of radiation of the environment light. Here, the environment light is the light source that illuminated the object at the time of shooting, and includes a light source other than those controlled by the digital camera 100 such as sunlight or indoor lighting, and a light source controlled by the digital camera 100 such as a built-in and/or external flash. The shading condition detection unit 207 outputs the evaluation value and the direction of radiation of the environment light as shading information to the virtual light source control unit 208. Detailed operations of the shading condition detection unit 207 will be described later.

The virtual light source control unit 208 determines the direction of radiation of virtual light for re-lighting the object based on the shading information, and outputs the direction of radiation of the virtual light as virtual light source information to the virtual light addition unit 205. Details of a method for determining the direction of radiation of the virtual light will be described later. Note that the present embodiment does not depend on radiation properties of the virtual light source (e.g., point light source, line light source, surface light source), and therefore uses the expression "the direction of radiation of virtual light", but if the virtual light source is the point light source, for example, the virtual point light source will be arranged on an extension line of the direction of radiation of the virtual light. Therefore, determining the direction of radiation of the virtual light is synonymous with determining the direction in which the virtual point light source is arranged.

Meanwhile, the gamma processing unit 203 applies gamma correction to the image signal RGB, and outputs the corrected image signal RGB to the degamma processing unit 204. Note that in a case of shooting in which the re-lighting processing is not performed, the gamma processing unit 203 outputs the corrected image signal RGB through the memory control unit 107 to the image memory 106. Whether or not the re-lighting processing is to be applied to the shot image may be determined in accordance with a user setting, for example. Note that description is given here in which the re-lighting processing is performed as a part of the shooting operations, but it is also possible to perform the re-lighting processing on a recorded image by reading out from the recording medium 112.

The degamma processing unit 204 performs degamma processing on the input image signal RGB, generates image signal RGB prior to the gamma correction, and outputs the signal to the virtual light addition unit 205. Note that in the case of shooting in which the re-lighting processing is performed, the configuration may be adopted in which the image signal RGB is directly input from the WB amplification unit 202 to the virtual light addition unit 205.

In the virtual light addition unit 205, the virtual light source is arranged based on the virtual light source information, and the re-lighting processing for applying the effects of the virtual light on the input image signal RGB is performed. The virtual light addition unit 205 outputs the image signal RGB that underwent the re-lighting processing to the re-gamma processing unit 206. In the re-gamma processing unit 206, gamma correction, which is similar to the processing of the gamma processing unit 203, is applied to the input image signal that underwent the re-lighting processing, and the signal is output to the image memory 106 via the memory control unit 107.

Figure 3A:
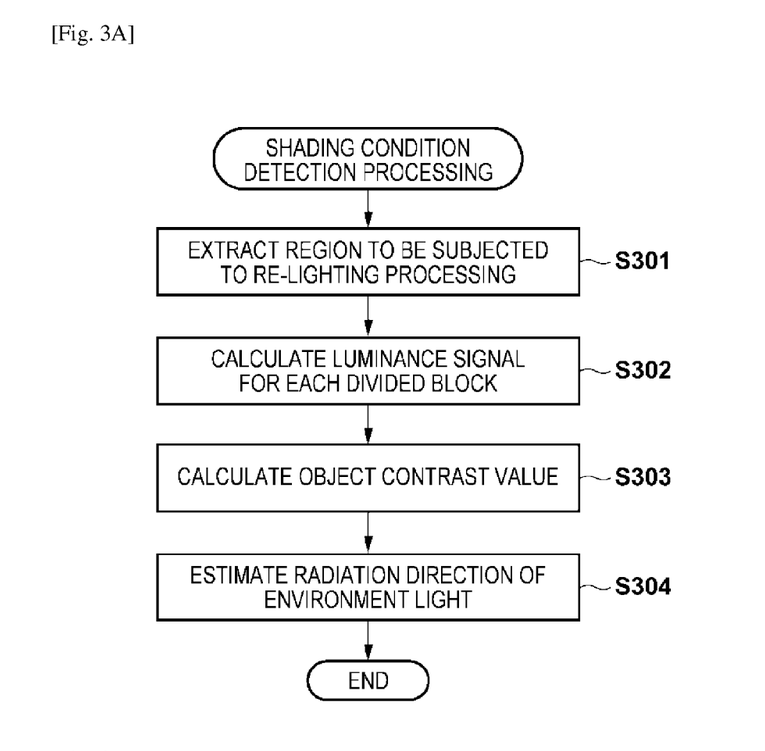
FIG. 3A is a flowchart showing processing by a shading condition detection unit in a first embodiment of the present invention.

Next, the detailed processing by the shading condition detection unit 207 for performing the calculation of the evaluation value that represents the condition of the shading of the object generated by the environment light and the detection of the direction of radiation of the environment light will be described with reference to the flowchart shown in FIG. 3A.

In step S301, the shading condition detection unit 207 extracts, from among the image signals RGB input from the WB amplification unit 202, an image signal corresponding to the object region to be subjected to the re-lighting processing. For example, in the case where the face region of a person detected by the face detection unit 113 is to be subjected to the re-lighting processing, the shading condition detection unit 207 obtains the face information from the face detection unit 113 and extracts the image signals RGB corresponding to the face region. The object region to be subjected to the re-lighting processing is not especially limited, and may be a region automatically detected from the characteristics of the image as with the face detection unit 113, or may be a region designated by a user through the operation unit 120. As an example, the case where the face region is to be subjected to the re-lighting processing will be described below.

Figure 3B:
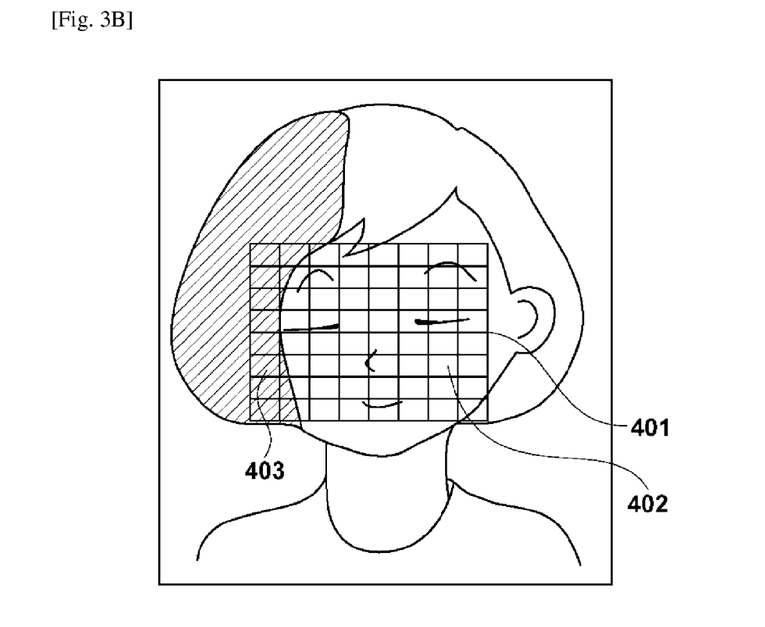
FIG. 3B is a schematic diagram showing an example of an object and an object region.

FIG. 3B shows an example of a person object and a face region, and oblique lines represent a shaded region. A detected face region 401 includes the shade region.

In step S302, the shading condition detection unit 207 calculates brightness information of the face region based on the image signal RGB included in the extracted face region 401. Specifically, as shown in FIG. 3B, the face region 401 is divided into a plurality of blocks (e.g., 64 blocks consisting of eight vertical blocks by eight horizontal blocks), a luminance average value and a color average value of the pixels are calculated for each block. Note that it is sufficient that color space conversion processing such as "RGB into YUV (YCbCr) or RGB into HSL" is performed in order to obtain a luminance signal value and a color signal value from the signal value of RGB, for example.

In step S303, the shading condition detection unit 207 calculates a contrast value between blocks whose colors are close as the evaluation value that represents the shading condition of the object in the region to be subjected to the re-lighting processing. For example, the shading condition detection unit 207 groups blocks having similar colors based on the color average values, and detects, in the group, a block in which the average luminance value is the largest (which is assumed to be a block 402) and a block in which the average luminance value is the smallest (which is assumed to be a block 403). The ratio of the maximum average luminance value to the minimum average luminance value is then calculated as the contrast value. Note that a determination condition for analogous colors can be defined in advance. Moreover, in the case where the color of the region to be subjected to the re-lighting processing can be postulated in advance, the configuration may be adopted in which the range of the postulated color signal is defined in advance and the contrast value is calculated for blocks having a color signal value that is within this range. For example, in the case where the re-lighting processing is to be performed on a face region, it is possible to define the range of the color signal postulated as a skin color in advance and to calculate the contrast value for blocks having the color signal value that is within that range. Note that in the case where the contrast value is calculated for a plurality of groups, the shading condition detection unit 207 may output one value as a representative value, or may output all of the values. The representative value may be the largest contrast value, for example.

In step S304, the shading condition detection unit 207 estimates the direction of radiation of the environment light. The shading condition detection unit 207 estimates the direction of radiation of the environment light using various known methods. For example, the (brightest) region in which regular reflection has occurred may be detected in the object so that a direction toward that region from a position symmetrical to a visual point position with respect to the normal vector of that region is estimated as the direction of radiation of the environment light. Also, if the object region is the face region of a person, an organ such as a nose may be detected, so that the direction opposite to the direction of the shade or shadow thereof may be estimated as the direction of radiation of the environment light. The shading condition detection unit 207 outputs the calculated contrast value and the direction information of the estimated environment light as shading information to the virtual light source control unit 208.

Next, virtual light source control processing by the virtual light source control unit 208 for determining the direction of radiation of the virtual light based on the shading information and the information on the direction of radiation of the environment light will be described.

Figure 5:
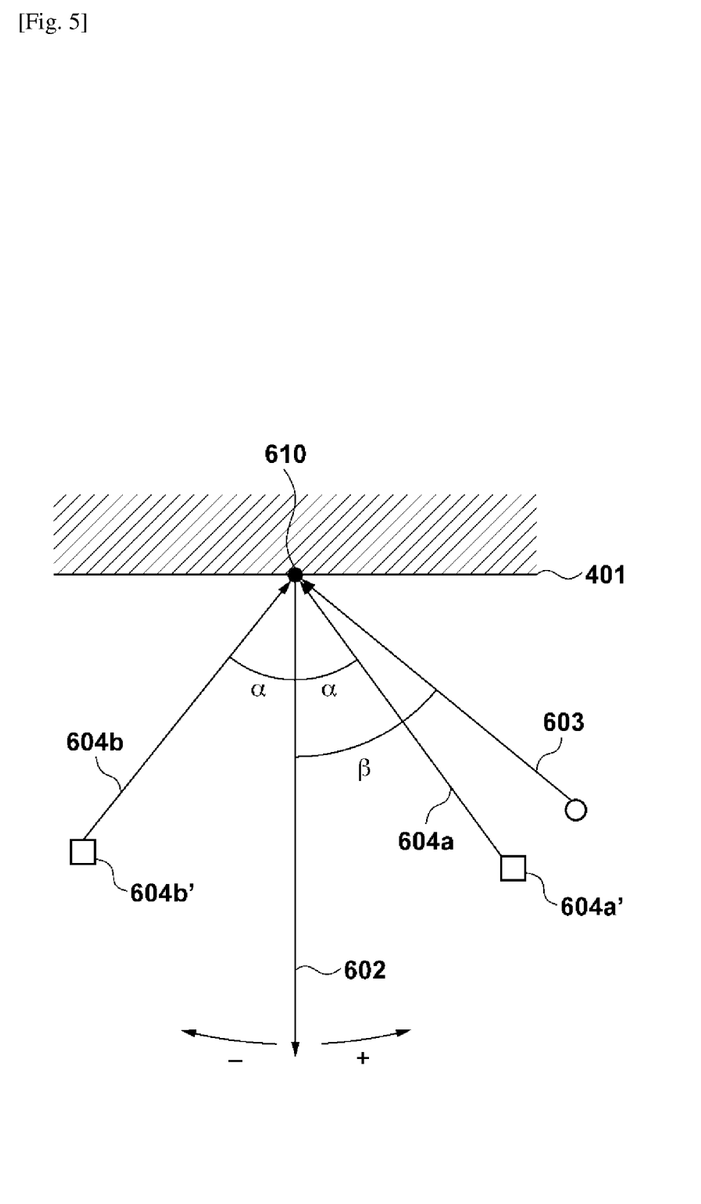
FIG. 5 is a schematic diagram for describing a method of determining the direction of radiation of virtual light in the first embodiment.

FIG. 5 is a diagram schematically showing the relation between the object region for applying the re-lighting processing and the directions of radiation of environment light and virtual light, as viewed from directly above. Here, it is assumed that the re-lighting processing is applied to the face region 401, similarly to FIG. 3B.

In FIG. 5, the face region 401, which is the object region for applying the re-lighting processing, is represented with a plane for simplification. Moreover, a normal vector 602 is a representative normal vector that represents the orientation of the face region 401. The normal vector that represents the orientation of the object region can be calculated using a known method. For example, the normal vector can be calculated by estimating the three-dimensional shape of the object from distance information of the object included in the object region. For example, the distance information of the object can be acquired from a plurality of images acquired while changing a focal distance in focus detection processing based on the relation between an in-focus part and the focal distance, or can be acquired from a distance image acquired using a distance measuring sensor, but (acquisition of the distance information) is not limited thereto.

Moreover, as with the case where the object region is the face region of a person, in the case of a region having characteristic sites with respect to which the size and shape of the characteristic sites and the positional relation of the characteristic sites varies depending on the orientation of the object, the representative normal vector can be calculated by estimating the orientation of the object based on the detection results of the characteristic sites. For example, in the case of the face region, the detection results of the outline of the face and organs such as eyes and nose are used as the characteristic sites so as to estimate the orientation of the face, and the representative normal vector can be calculated.

Moreover, the normal vector representing the orientation of the object may be calculated by averaging the normal vectors for the respective regions created by dividing the object region. Alternatively, the normal vector at the center or the centroid position of the object region to be subjected to the re-lighting may be used as the representative normal vector representing the orientation of the object.

From the direction estimated by the shading condition detection unit 207, environment light 603 illuminates coordinates (pixel) 610 where the representative normal vector 602 and the face region 401 intersect. Reference numeral 604a is an image of virtual light illuminating the coordinates 610 from a virtual point light source 604a' and reference numeral 604b is an image of virtual light illuminating the coordinates 610 from a virtual point light source 604b'. The virtual point light sources 604a' and 604b' are arranged at symmetrical positions with respect to the normal vector 602. Here, if it is assumed that an angle formed by the normal vector and the direction of radiation takes a positive value counterclockwise, an angle formed by the virtual point light source 604a' and the normal vector and an angle formed by the virtual point light source 604b' and the normal vector have the same absolute value and opposite signs. Note that it is sufficient to appropriately define the distance between the virtual point light source 604a' and the face region 401 and the distance between the virtual point light source 604b' and the face region 401.

Figure 4:
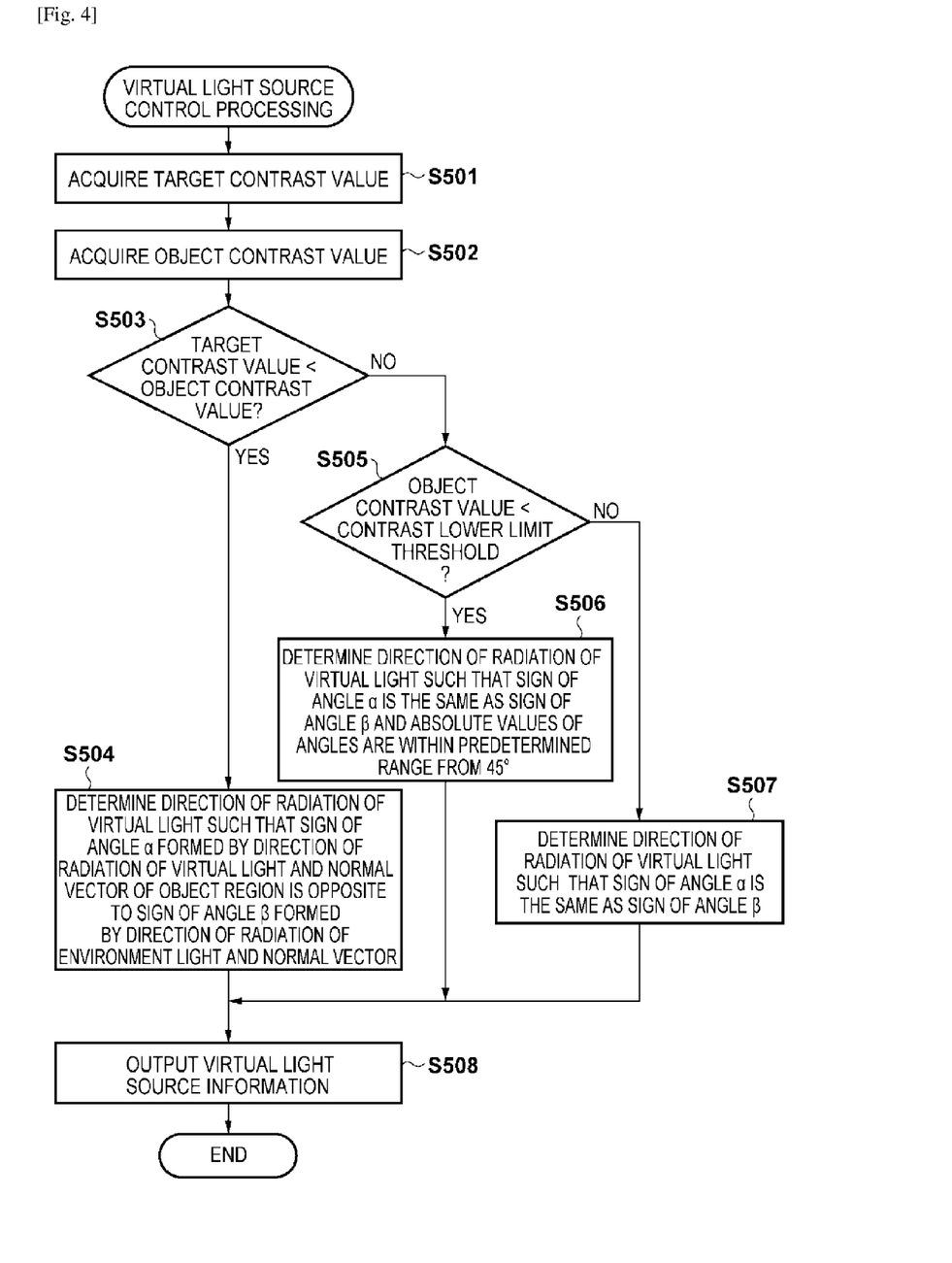
FIG. 4 is a flowchart showing processing by a virtual light source control unit in the first embodiment.

Next, the detailed processing of the virtual light source control unit 208 will be described with reference to the flowchart in FIG. 4.

In step S501, the virtual light source control unit 208 acquires from the system control unit 50, for example, the target value of the contrast value which is realized using the re-lighting processing. The target value can be set in advance in the nonvolatile memory 121, for example. Note that a different target value may be set in accordance with the type of the object region on which the re-lighting processing is to be performed.

In step S502, the virtual light source control unit 208 acquires the contrast value generated due to the environment light, which was detected in the captured image by the shading condition detection unit 207.

In step S503, the virtual light source control unit 208 compares the detected contrast value with the target value. In the case where the detected value is greater than the target value, the procedure moves on to step S504, and in the case where the detected value is less than or equal to the target value, the procedure moves on to step S505.

The procedure moves on to step S504 in the case where it is determined that the contrast of the object region due to the environment light is high. Accordingly, in step S504, the virtual light source control unit 208 determines the direction of radiation of the virtual light so that the sign of an angle $\alpha$ formed by the direction of radiation of the virtual light and the normal vector 602 is opposite to the sign of an angle $\beta$ formed by the direction of radiation of the environment light and the normal vector 602. Note that it can be said that the angle $\alpha$ is an angle that a line connecting the coordinates of the virtual light source and the starting point of the normal vector (the intersection of the normal vector and the object region) forms with the normal vector. Similarly, it can be said that the angle $\beta$ is an angle that a line connecting the coordinates of the environment light source and the starting point of the normal vector (an intersection of the normal vector and the object region) forms with the normal vector.

In the example in FIG. 5, the direction of radiation of the virtual light 604b can be a direction of −45 degrees ($\alpha=-45°$) with respect to the normal vector 602, or can be a direction ($-\beta$) symmetrical with respect to the environment light with the normal vector 602 sandwiched in between, for example. However, these are merely examples, and the determination of the direction of radiation of the virtual light is not limited thereto as long as the shade portion of the object can be corrected so as to be brightened using virtual light and the contrast of the object region can be lowered. When the direction of radiation of the virtual light is determined, the virtual light source control unit 208 advances the procedure to step S508.

On the other hand, the procedure is advanced to step S505 in the case where it is determined that the contrast of the object region due to the environment light is low. Therefore, the virtual light source control unit 208 determines the arrangement of the virtual light source so that the illuminated areas of the environment light and the virtual light overlap, thereby enhancing the contrast.

Specifically, in step S505, the virtual light source control unit 208 determines whether or not the detected contrast value is less than a predetermined lower limit threshold. In the case where the value is less than the predetermined lower limit threshold, the procedure is advanced to step S506, and in the case where the value is greater than or equal to the predetermined lower limit threshold, the procedure is advanced to step S507.

The procedure is advanced to step S506 in the case where the environment light substantially evenly illuminates the object region substantially from the front and substantially no shading has been generated due to the environment light. In such a case, because the object has a poor stereoscopic effect, the re-lighting processing using the virtual light adds natural shading to the object so as to improve the stereoscopic effect of the object. Therefore, the virtual light source control unit 208 determines the direction of radiation of the virtual light so that the sign of the angle $\alpha$ formed by the direction of radiation of the virtual light and the normal vector 602 is the same as the sign of the angle $\beta$ formed by the direction of radiation of the environment light and the normal vector 602. Especially, in step S506, the virtual light source control unit 208 determines the direction of radiation of the virtual light so that the absolute value of the angle $\alpha$ formed by the direction of radiation of the virtual light and the normal vector 602 is in a predetermined range centered on 45° in order to enhance the contrast. This is because an appropriate contrast is often achieved if a typical object is illuminated at an angle of 45° to the normal vector 602. Specifically, the virtual light source control unit 208 can determine the absolute value of the angle $\alpha$ formed by the direction of radiation of the virtual light and the normal vector 602 to be in the range of 45°±15°, preferably 45°±10°, and more preferably 45°±5°. The absolute value of the angle $\alpha$ may, of course, be set to a fixed value $\alpha=45°$. When the direction of radiation of the virtual light is determined, the virtual light source control unit 208 advances the procedure to step S508.

The procedure is advanced to step S507 in the case where a certain amount of shading on the object is generated due to the environment light but the target contrast has not been achieved. Also in this case, the re-lighting processing using the virtual light adds natural shading to the object so as to enhance the stereoscopic effect on the object. Therefore, the virtual light source control unit 208 determines the direction of radiation of the virtual light so that the sign of the angle $\alpha$ formed by the direction of radiation of the virtual light and the normal vector 602 is the same as the sign of the angle $\beta$ formed by the direction of radiation of the environment light and the normal vector 602. However, because a certain amount of contrast has been acquired due to environment light, the range of the angle $\alpha$ is not limited, unlike the case of step S506.

However, from the viewpoint of harmony with the shading of other regions that are not subjected to the re-lighting processing, it is possible to determine the direction of radiation of the virtual light using the direction of radiation of the environment light as a reference. In this case, the virtual light source control unit 208 can determine the absolute value of the angle $\alpha$ formed by the direction of radiation of the virtual light and the normal vector 602 in the ranges of $|\beta|±15°$, preferably, $|\beta|±10°$, and more preferably, $|\beta|±5°$. Alternatively, $\alpha=\beta$, i.e. the direction of radiation of the virtual light being the same as the direction of radiation of the environment light may be determined. When the direction of radiation of the virtual light is determined, the virtual light source control unit 208 advances the procedure to step S508.

In step S508, the virtual light source control unit 208 outputs the determined direction of the radiation of the virtual light as virtual light source information to the virtual light addition unit 205. Note that the virtual light source control unit 208 may output, as the virtual light source information, information on the preset position of the virtual light source (distance from the virtual light source to the object) to the virtual light addition unit 205.

Next, the re-lighting processing of the virtual light addition unit 205 for applying the effects of the virtual light will be described. In the present embodiment, the virtual light addition unit 205 calculates output RGB values (Rout, Gout, Bout) of the pixel that is to be subjected to the processing and was illuminated by the virtual light, in accordance with the following equations.

$$Rout = [Rt + A * \cos(\theta) * (1/D^2) * R/v]/M$$

$$Gout = [Gt + A * \cos(\theta) * (1/D^2) * G/v]/M$$

$$Bout = [Bt + A * \cos(\theta) * (1/D^2) * B/v]/M$$

Here, (Rt, Gt, Bt) are pixel values to be subjected to the processing, A is a predetermined constant representing the intensity of the virtual light source, D is the distance between the virtual light source and the object within the region to be subjected to the re-lighting, and (Rv, Gv, Bv) are light source reflection colors. Moreover, M is a preset constant for normalizing the output RGB values after the re-lighting, the angle θ is an angle formed by the direction of radiation of the virtual light determined by the virtual light source control unit 208 and the normal vector of the object of the pixel to be subjected to the processing. Here, the normal vector of the object is calculated for each pixel of the region to be subjected to re-lighting, and the angle θ can be calculated from the direction of the normal vector and the direction of radiation of the virtual light.

Alternatively, as shown in FIG. 3B, the angle θ may be calculated for each block by dividing the object region to be subjected to the re-lighting into a plurality of blocks and calculating the normal vector for each block. Alternatively, in the case where the three-dimensional shape of the object included in the region to be subjected to the re-lighting processing is postulated in advance, as with the case where the region to be subjected to the re-lighting is the face region of a person, the angle θ may be calculated by estimating the normal vector of the object corresponding to the pixels to be subjected to the processing from the positions of the pixels in the region.

Moreover, light source reflection colors (Rv, Gv, Bv) represent colors when the virtual light is reflected by the object surface, and can be estimated from preset virtual light source colors and the colors of the pixels to be subjected to the processing. Moreover, it is sufficient to determine the intensity A of the virtual light source in accordance with the difference between the detected value and the target value of the contrast value. Therefore, regarding the case where the detected value of the contrast value is less than the contrast lower limit threshold and the case where the detected value of the contrast value is greater than or equal to the contrast lower limit threshold, the determined intensity A of the virtual light source is greater in the former case. The specific relation of the difference between the detected value and the target value of the contrast value and the intensity A can be defined in advance.

As described above, in the present embodiment, the evaluation value representing the condition of shading is calculated for the object region to be subjected to the re-lighting processing, and the direction of radiation of the virtual light is determined so that the evaluation value approaches to the target value. Specifically, the direction of radiation of the virtual light is determined so as to increase the shading generated due to the environment light in the case where the evaluation value is less than the target value and to lessen the shading generated due to the environment light in the case where the evaluation value is greater than the target value. Therefore, not only re-lighting processing that lessens the shading caused by the environment light, but also re-lighting processing that increases the shading caused by the environment light can be realized. Furthermore, because the direction of radiation is determined on the basis of a direction that varies in accordance with the lack of the shading, adjustment that places importance on effectively increasing the shading and adjustment that places importance on harmony with the environment light can be realized.

Note that in the present embodiment, the case where information on contrast is used as the evaluation value representing the shading condition of the region to be subjected to the re-lighting processing has been described, but other evaluation values can also be used. For example, the shaded region of the object generated due to the environment light may be detected, and information representing properties of the boundary of that region may be used as the evaluation value representing the condition of shading. Specifically, the gradient of the brightness in the vicinity of the boundary of the shaded region of the object is calculated, and the direction of radiation of the virtual light can be determined so as to lessen (increase) the shading generated due to the environment light in the case where the gradient is greater (less) than a predetermined target. This enables re-lighting processing that makes the boundary of the shaded region of the object inconspicuous in the case where the boundary of the shade of the object is clear, and emphasizes the shade of the object in the case where the shade of the object is unclear, thereby making it possible to acquire an image with preferred shading.

Moreover, the area of the shade in the object region may be calculated so as to use the result as the evaluation value representing the condition of the shading of the object. Specifically, the ratio of the shade region constituting the object region is calculated, and in the case where the ratio is greater than a predetermined target, the direction of radiation of the virtual light can be determined so as to weaken the shading generated due to the environment light. Moreover, in the case where the ratio is less than the predetermined target, the virtual light source control unit 208 decreases the luminance of the object region by a determined amount and increases the area of the shade (area of the region in which the average luminance value is less than or equal to a pre-defined threshold). The direction of radiation of the virtual light can then be determined so that the sign of the angle α and the sign of the angle β are the same and the absolute value of the angle α is greater than or equal to the absolute value of the angle β. Accordingly, the re-lighting processing is enabled, which reduces the area of the shade in the case where there is a lot of shade in the object region and increases the area of the shade in the case where there is little shade in the object region, thereby making it possible to acquire an image with preferred shading.

Moreover, the luminance histogram of the pixel of the object region may be calculated so that the direction of radiation of the virtual light is determined in accordance with the deviation of the frequency distribution thereof. Specifically, the total of the frequencies corresponding to a luminance value range that is less than a predetermined threshold is used as the evaluation value, and in the case where the evaluation value is greater than a predetermined target, the direction of radiation of the virtual light can be determined so as to weaken the shading due to the environment light. Moreover, in the case where the evaluation value is less than the predetermined target, the virtual light source control unit 208 can reduce the luminance of the object region by a predetermined amount, and determine the direction of radiation of the virtual light such that the angle α and the angle β have the same sign and the absolute value of the angle α is greater than or equal to the absolute value of the angle β.

Moreover, in the present embodiment, description was given in which the target value of the evaluation value representing the condition of the shading is defined in advance, but the target value may be dynamically set. For example, the target value in accordance with a shooting mode or a camera parameter used to shoot an image may be set. Examples of the dynamic setting of the target value based on camera parameters include setting of the target value in accordance with the properties of a gamma curve used when recording images or used by the gamma processing unit 203. For example, it is possible to set a high target value if the property (shape) of the gamma curve is a property that strongly expresses the contrast, and a low target value if the property (shape) of the gamma curve is a property that weakly expresses the contrast.

Moreover, the target value may be set in accordance with the contrast of a background object positioned at the back of or around the region to be subjected to the re-lighting processing. Specifically, by setting a high (low) target value in the case where the contrast of the background object is high (low), it is possible to bring the contrast of the object to be subjected to the re-lighting processing closer to the contrast of the surrounding object. Accordingly, unnaturalness due to the re-lighting processing can be suppressed.

Moreover, in the present embodiment, a configuration was described in which the direction of radiation of the virtual light is determined in accordance with the comparison result of the evaluation value and the target value. However, other methods may be used as long as they are methods for determining the direction of radiation of the virtual light based on the shading of the object. For example, if the contrast value of the object region is greater than or equal to (less than) a predetermined threshold, the direction of radiation of the virtual light can be determined so as to lessen (increase) the shade generated due to the environment light using the virtual light. Thereby, the re-lighting processing can be controlled even in the case where the target value of the evaluation value is not defined. Alternatively, control may be performed so as to not perform the re-lighting processing in the case where the difference between the evaluation value and the target value is less than or equal to a predetermined threshold.

Moreover, brightness correction processing may also be performed on an object not to be subjected to the re-lighting processing. Specifically, the contrast value, after the re-lighting, of the object that is subjected to the re-lighting processing is calculated, and the brightness is corrected so as to bring the contrast of the object that is not subjected to the re-lighting processing closer to that value. Thereby, it is possible to reduce any unnaturalness that occurs between the object that is subjected to the re-lighting processing and the object that is not subjected to the re-lighting processing. The brightness of the pixels may be evenly adjusted for the object that is not subjected to the re-lighting processing.

Moreover, in the present embodiment, a configuration was described in which the direction of radiation of the virtual light is determined using the angle formed by the representative normal vector of the region to be subjected to the re-lighting processing and the direction of the virtual light, but the direction of radiation of the virtual light may be determined using other methods. For example, whether the object within the region to be subjected to the re-lighting processing is illuminated from above, below, the left or the right may be determined.

Moreover, in the present embodiment, the case where the number of regions to be subjected to the re-lighting processing is one was described, but there may be a plurality of regions to be subjected to the re-lighting processing. For example, in the case where the face detection unit 113 detects a plurality of face regions, each of the face regions may be regarded as a region to be subjected to the re-lighting processing. In this case, there is a possibility that the directions of the objects within the face regions are individually different, and therefore the above-described processing by the shading condition detection unit 207, the virtual light source control unit 208, and the virtual light addition unit 205 are performed on each of the face regions. However, it is assumed that the type and the target value of the evaluation value representing the shading condition are in common among all the face regions. Thereby, even in the case where there are a plurality of object regions for the re-lighting processing, it is possible to perform the re-lighting processing so that each of the shading conditions is a preferred condition.

Alternatively, in the case where a plurality of objects are shot, control may be performed so that the position of the virtual light source is determined on the basis of the shading condition of an object that is the most important among the plurality of objects and the re-lighting is performed on the other objects using the virtual light source in the same position. Thereby, it is possible to prevent the unnaturalness of the objects in the same environment being illuminated from different directions.

Moreover, in the present embodiment, the virtual light source was described as a point light source, but the properties of the virtual light source do not directly influence the present invention, and a light source having other properties may be used. For example, a virtual light source that irradiates parallel light may be used. In this case, the direction of radiation of the virtual light will be the direction of radiation of the parallel light.

Moreover, in the above description, for simplification, the normal vector and the directions of radiation of environment light and virtual light and the like were described from a two-dimensional viewpoint with respect to a horizontal plane. However, in actuality, the processing is performed with the normal vector and these directions as a vector and directions in a three-dimensional space.

Second Embodiment

Next, the second embodiment of the present invention will be described with reference to FIGS. 6A, 6B, and 7. In the first embodiment, the direction of radiation of the virtual light was determined based on an evaluation value representing the shading condition of the object within the region to be subjected to the re-lighting processing and the direction of radiation of the environment light, but in the present embodiment, the direction of radiation of the virtual light is determined more specifically.

The present embodiment can be realized by using the configurations of the digital camera 100 and the image processing unit 105 described in the first embodiment. Therefore, description of the items described in the first embodiment is omitted, and the operations of the shading condition detection unit 207, the virtual light source control unit 208, and the virtual light addition unit 205 will be described.

Figure 6A:
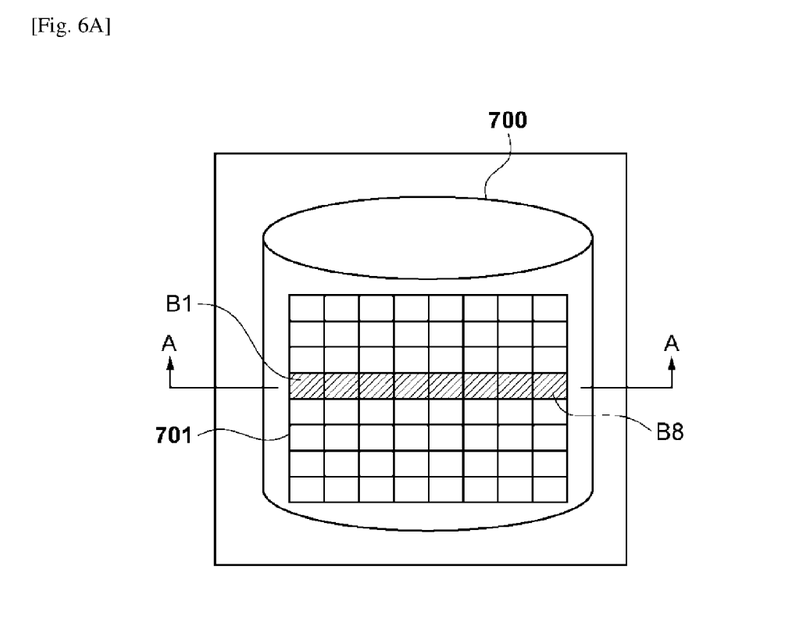
FIG. 6A is a diagram schematically showing the relation between an object and a virtual light source in a second embodiment.
Figure 7:
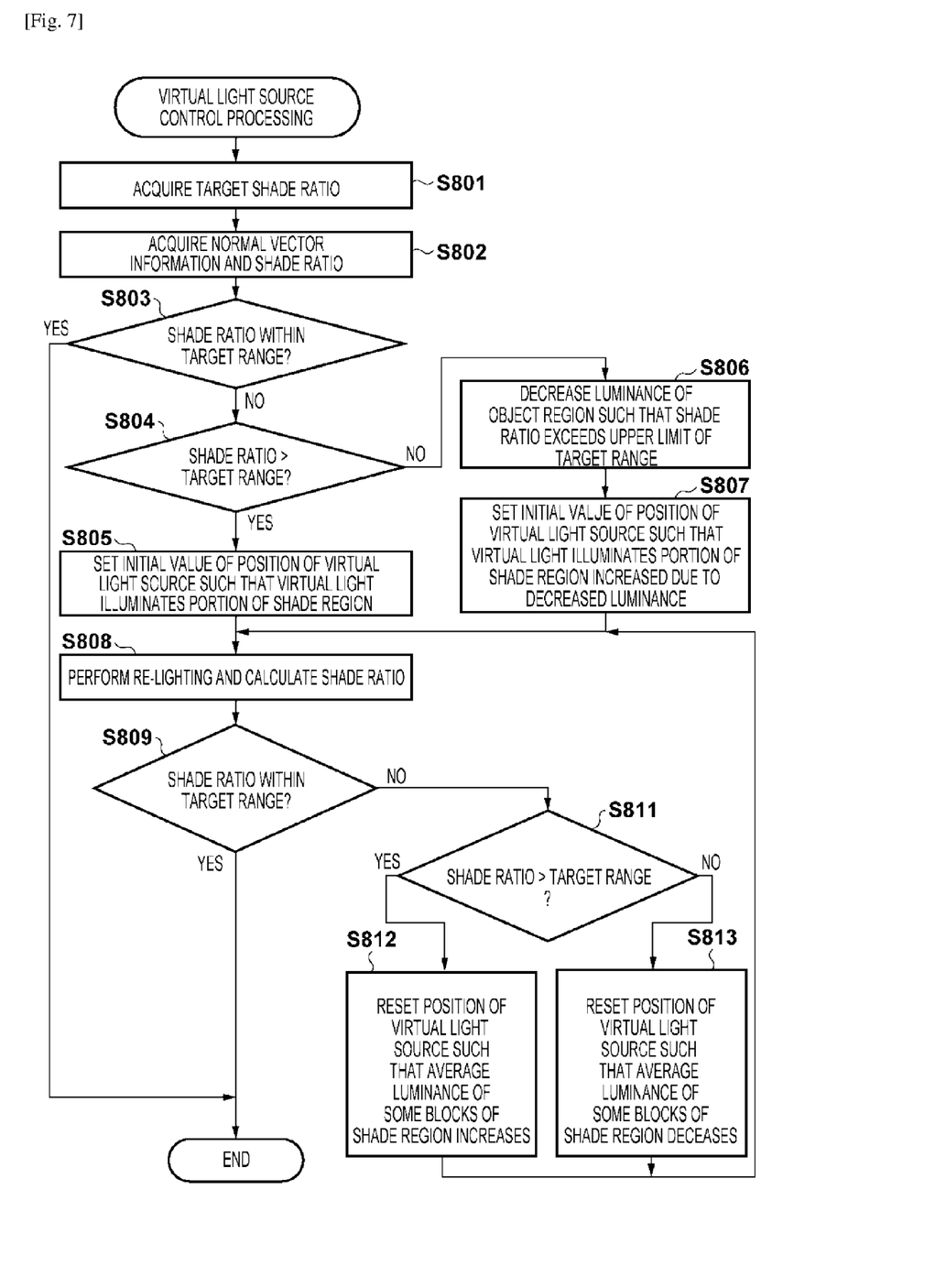
FIG. 7 is a flowchart showing processing by a virtual light source control unit in the second embodiment.

FIG. 6A schematically shows an object 700 in the second embodiment and an object region 701 within the image to be subjected to the re-lighting processing.

The shading condition detection unit 207 divides the object region 701 into a plurality of blocks (64 blocks consisting of eight vertical blocks by eight horizontal blocks), and calculates the luminance average value of the pixels for each of the blocks.

Moreover, in the present embodiment, the shading condition detection unit 207 further calculates a ratio (shade ratio) of the area of the shade region to the area of the object region 701. Specifically, the shading condition detection unit 207 calculates the shade ratio as (the number of blocks in which the average luminance value is less than a predetermined threshold)/(the total number of the blocks). Furthermore, the shading condition detection unit 207 calculates the direction of the normal vector of the object for each block.

Figure 6B:
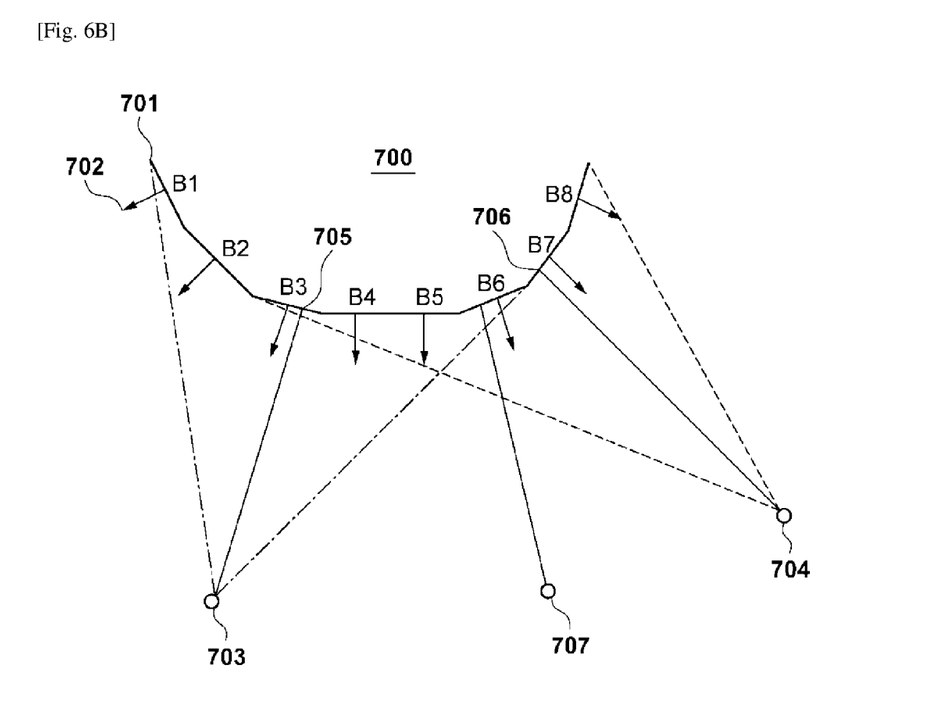
FIG. 6B is a diagram schematically showing the relation between an object and a virtual light source in a second embodiment.

FIG. 6B schematically shows examples of normal vectors 702 calculated for blocks B1 to B8 in FIG. 6A, as well as the horizontal cross-sectional shape A-A of the object 700. In the description of the first embodiment, the overall object surface was regarded as one plane for simplification, but the present embodiment is different from the first embodiment in that the object surface is handled as planes of the respective divided blocks.

The shading condition detection unit 207 outputs, to the virtual light source control unit 208, the calculated information on the normal vector for each block and the shade ratio as the evaluation value representing the shading condition of the object within the region to be subjected to the re-lighting.

Next, virtual light source control processing performed by the virtual light source control unit 208 in the second embodiment will be described with reference to the flowchart shown in FIG. 7.

In step S801, the virtual light source control unit 208 acquires, from the system control unit 50, for example, a target shade ratio as the target value of the shading condition of the object, which is realized by the re-lighting processing.

In step S802, the virtual light source control unit 208 acquires, from a shot image, information on the normal vector of the object region 701 for each block and the shade ratio which have been calculated by the shading condition detection unit 207.

In step S803, the virtual light source control unit 208 compares the shade ratio with the target value, and determines whether or not the difference is within the range of a predetermined threshold (i.e. whether or not the shade ratio is within a target range). The virtual light source control unit 208 determines that the re-lighting processing is not necessary if the shade ratio within the target range has been acquired, ends the procedure, and outputs the image to the re-gamma processing unit 206. In the case where the shade ratio within the target range has not been acquired, the procedure is advanced to step S804.

In step S804, the virtual light source control unit 208 determines whether or not the shade ratio exceeds an upper limit of the target range. If the shade ratio exceeds the upper limit, the procedure is advanced to step S805, and if the shade ratio does not exceed the upper limit (i.e., if the shade ratio is less than a lower limit of the target ratio), the procedure is advanced to step S806.

In step S805, the virtual light source control unit 208 sets an initial value of the position of virtual light source so that the virtual light illuminates the current shade region (blocks in which the average luminance value is less than the threshold), and advances the procedure to step S808. It is assumed that the position of the virtual light source is defined using two pieces of information, that is, the coordinates of the centers of the blocks for the re-lighting processing (corresponding to reference numerals 705 and 706 in FIG. 6B) and the distances from the points at those centers to the virtual light source. Note that the range illuminated by the virtual light can be determined from the position of the virtual light source and the direction of the normal vector of each block of the object region using the fact that light from a direction exceeding 90° to the normal vector of a region (block) does not reach the region.

On the other hand, in step S806, the virtual light source control unit 208 first decreases the luminance of the object region until the shade ratio exceeds the upper limit of the target range (decreases the luminance by a certain amount, and the processing of calculating the shade ratio by the shading condition detection unit 207 is repeated until the shade ratio exceeds the upper limit of the target range).

In step S807, the virtual light source control unit 208 sets an initial value of the position of the virtual light source so that a portion of the shaded region that increased due to the decreased luminance (region in which the luminance has decreased to correspond to that of the shaded region) is illuminated by the virtual light, and advances the procedure to step S808.

In step S808, the virtual light source control unit 208 outputs the set position of the virtual light source to the virtual light addition unit 205, performs the re-lighting, and calculates the shade ratio for the object region after the processing of the shading condition detection unit 207. Specifically, the virtual light addition unit 205 calculates the output RGB values (Rout, Gout, Bout) of the pixels (pixels to be subjected to the processing) included in region in which an angle formed by the virtual light and the normal vector is less than or equal to 90° in accordance with the following equations.

$$Rout = [Rt + A*\cos(\theta\_n)*(1/Dn^2)*R/v]/M$$

$$Gout = [Gt + A*\cos(\theta\_n)*(1/Dn^2)*G/v]/M$$

$$Bout = [Bt + A*\cos(\theta\_n)*(1/Dn^2)*B/v]/M$$

Here, (Rt, Gt, Bt) are pixel values to be subjected to processing, A is a predetermined constant representing the intensity of the virtual light source, D is a distance between the virtual light source and the object within the region to be subjected to the re-lighting, and (Rv, Gv, Bv) are light source reflection colors. Moreover, M is a constant set in advance for normalizing the output RGB values after the re-lighting. $\theta\_n$ is an angle that the normal vector of an n-th (n is an integer from 1 to 64) block forms with a line connecting the starting point of the normal vector (the center of the block) and the position of the virtual light source, and Dn is a distance between the center of the n-th block and the virtual light source.

The virtual light source control unit 208 then acquires the output RGB values calculated by the virtual light addition unit 205 and outputs the values to the shading condition detection unit 207, so that the shade ratio after the re-lighting processing is obtained. Specifically, the shading condition detection unit 207 calculates an average luminance value for each of the divided blocks, calculates the shade ratio after the re-lighting processing as (the total number of blocks in which the average luminance value is less than a predetermined threshold)/the number of divisions (64), and output the shade ratio to the virtual light source control unit 208.

In step S809, the virtual light source control unit 208 performs determination similarly to step S803 from the calculated shade ratio after the re-lighting processing and the target value. The virtual light source control unit 208 ends the procedure if the shade ratio after the re-lighting processing is within the target range, and outputs the image after the re-lighting processing to the re-gamma processing unit 206. On the other hand, if the shade ratio is out of the predetermined threshold range, the virtual light source control unit 208 advances the procedure to step S811.

In step S811, the virtual light source control unit 208 determines whether or not the shade ratio after the re-lighting exceeds the upper limit of the target range, similarly to step S804. If the shade ratio exceeds the upper limit, the procedure is advanced to step S812, and if the shade ratio does not exceed the upper limit (i.e. the shade ratio is less than the lower limit of the target ratio), the procedure is advanced to step S813.

In step S812, the virtual light source control unit 208 changes and resets the position of the virtual light source so that the average luminance of some of the shade region blocks increases, and returns the procedure to step S808.

In step S813, the virtual light source control unit 208 changes and resets the position of the virtual light source so that the average luminance of some of the shade region blocks decreases, and returns the procedure to step S808.

Here, a method of changing the position of the virtual light source in step S812 and step S813 will be described with reference to FIG. 6B. In FIG. 6B, reference numeral 707 indicates an environment light source that is shown schematically. Typically, in the case where the properties and positions of the environment light source and the virtual light source are identical, there is no difference between the illuminated area of the virtual light and the illuminated area of the environment light, and therefore the shade ratio of the object region does not change before and after the re-lighting processing. Then, the more the environment light source and the virtual light source are separated from each other, the more the shade ratio decreases due to the re-lighting processing.

For example, virtual light from a virtual light source 703 in FIG. 6B reaches the range from blocks B1 to B6, but does not reach blocks B7 and B8. Moreover, virtual light from a virtual light source 704 reaches the range from blocks B3 to B8, but does not reach blocks B1 and B2. Therefore, because the virtual light source control unit 208 can control the object region to be corrected to be brightened with the re-lighting processing by appropriately determining the positions of the virtual light sources, it is possible to bring the area ratio of the shade region of the object closer to the predetermined target value. Especially, the shade ratio after the re-lighting is substantially decreased when the virtual light strikes a region that was in shadow before the re-lighting as with blocks B1 and B2. Accordingly, if the difference between the value of the shade ratio and the target value of the shade ratio is large, it is possible to effectively bring the shade ratio closer to the target value by setting the position of the virtual light source so that the virtual light illuminates low luminance blocks.

On the other hand, in the case where the shade ratio needs to be increased, the position of the virtual light source is changed for the shaded region that was increased due to the decreased luminance in step S806 so that the range illuminated by the virtual light is made less than that at the time of previous re-lighting or the amount of the virtual light is reduced. This can be realized by adjustment involving at least one of changing the center position for the re-lighting processing and adjusting a distance from the center position for the re-lighting.

In this manner, the virtual light source control unit 208 repeats the processing of step S808 onward until the shade ratio of the object after the re-lighting falls within the predetermined threshold range. However, a configuration may be adopted in which an upper limit to the number of times of this repetition is provided and the procedure is ended in the case where the upper limit is reached.

Note that in the present embodiment, a case in which the shade ratio is used as the evaluation value representing the condition of the shading of the object was described, but similar control can also be performed by using the contrast value described in first embodiment. In this case, it is sufficient that the position of the virtual light source is determined so as to illuminate a region that is not the shaded region using the virtual light in the case where it is desired to increase the contrast value, and to illuminate the shaded region using the virtual light in the case where it is desired to decrease the contrast value. Moreover, the range of the desired target values can be realized by adjusting the illuminated area in step S812 and step S813.

Note that in the present embodiment, a configuration in which the resetting of the position of the virtual light source is repeated until the shade ratio reaches the predetermined target range was described, but the resetting is not necessary. For example, the position of the virtual light source may be determined in one execution of the processing based on the size of the difference between the detected shade ratio and the target value. For example, the position of the virtual light source can be determined such that the larger the shade ratio compared with the target value is, the more the area of the shade region included in the illuminated area of the virtual light increases. The position of the virtual light source can also be determined such that the smaller the shade ratio compared with the target value is, the more the area of the shade region generated due to the decreased luminance and included within the illuminated area of virtual light decreases. Thereby, without repeatedly determining the arrangement of the virtual light source, it is possible to perform the re-lighting processing so as to bring the condition of the shading close to the targeted shading condition.

In this manner, according to the present embodiment, the position of the virtual light source can be finely adjusted, enabling flexible adjustment of the shading condition to be realized, in addition to effects similar to those of the first embodiment.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197506, filed on Sep. 26, 2014, which is hereby incorporated by reference herein in its entirety.

The invention claimed is:

1. An image processing apparatus comprising:
one or more processors; and
a memory that stores a program which, when executed by the one or more processors, causes the one or more processors to function as units comprising:
(1) a calculation unit configured to calculate an evaluation value representing a degree of shading for an object region in an image;
(2) a determination unit configured to determine, based on the evaluation value, if the degree of shading for an object region is necessary to be increased or decreased;
(3) a setting unit configured to set a virtual light source based on the determination result of the determination unit; and
(4) a correction unit configured to apply effects of virtual light irradiated by the virtual light source in the image,
wherein the calculation unit calculates the evaluation value based on one or more of (a) contrast of the object region, (b) a luminance histogram of the object region in the image, (c) properties of a boundary of a shaded region of the object region, and (d) an area of a shaded region of the object region,
wherein the setting unit sets the virtual light source so that the virtual light illuminates a shaded region of the object region, in a case where it is determined by the determination unit that the shading needs to be decreased, and
wherein the setting unit sets the virtual light source so that illuminated areas in the object region due to environmental light and the virtual light overlap, in a case where it is determined by the determination unit that the shading needs to be increased.

2. The image processing apparatus according to claim 1, wherein the calculation unit estimates a direction of radiation of environmental light when the image was shot, and
wherein the setting unit sets the virtual light source based on the determination result of the determination unit and the direction of radiation of the environmental light.

3. The image processing apparatus according to claim 2, wherein the setting unit sets the virtual light source so that a sign of an angle formed by the direction of radiation of the environmental light and a normal vector representing the object region is different from a sign of an angle formed by the direction of radiation of the virtual light and the normal vector, in a case where it is determined by the determination unit that the shading needs to be decreased.

4. The image processing apparatus according to claim 2, wherein the setting unit sets the virtual light source so that a sign of an angle formed by the direction of radiation of the environmental light and a normal vector representing the object region is the same as a sign of an angle formed by the direction of radiation of the virtual light and the normal vector, in a case where it is determined by the determination unit that the shading needs to be increased.

5. The image processing apparatus according to claim 1, wherein the setting unit sets the virtual light source so that the virtual light illuminates a shaded region of the object region, in a case where it is determined by the determination unit that the shaded region of the object region needs to be reduced.

6. The image processing apparatus according to claim 1, wherein the setting unit sets the virtual light source after decreasing luminance of the object region, in a case where it is determined by the determination unit that a shaded region of the object region needs to be increased.

7. The image processing apparatus according to claim 6, wherein, in a case where it is determined by the determination unit that a shaded region of the object region needs to be increased, the setting unit sets the virtual light source so that a portion of a region, of which luminance becomes corresponding to that of a shaded region due to the luminance being decreased, is illuminated by the virtual light.

8. The image processing apparatus according to claim 1, wherein the calculation unit further calculates the evaluation value for the image corrected by the correction unit, and
wherein the setting unit resets the virtual light source if the evaluation value for the image corrected by the correction unit is not within a predetermined target range.

9. The image processing apparatus according to claim 8, wherein calculation of the evaluation value by the calculation unit and resetting of the virtual light source by the setting unit are repeated until the evaluation value falls within the target range.

10. The image processing apparatus according to claim 1, wherein the determination unit determines if the degree of shading for an object region is necessary to be increased or decreased based on the evaluation value and a target value that is set dynamically in accordance with a shooting mode or a camera parameter used when the image was shot.

11. The image processing apparatus according to claim 10, wherein the target value is set to a lower value in a case where a gamma curve used for gamma correction of the image has a property that strongly expresses contrast, than in a case where the gamma curve has a property that weakly expresses contrast.

12. The image processing apparatus according to claim 1, wherein the object region is a region based on detection of a characteristic of the image or a designation by a user.

13. The image processing apparatus according to claim 1, wherein the correction unit further performs, on a region excluding the object region, correction based on the shading of the object region.

14. The image processing apparatus according to claim 1, wherein the calculation unit calculates the evaluation value based on the contrast of the object region.

15. The image processing apparatus according to claim 1, wherein the calculation unit calculates the evaluation value based on the luminance histogram of the object region in the image.

16. The image processing apparatus according to claim 1, wherein the calculation unit calculates the evaluation value based on the properties of the boundary of the shaded region of the object region.

17. The image processing apparatus according to claim 1, wherein the calculation unit calculates the evaluation value based on the area of the shaded region of the object region.

18. An image capturing apparatus comprising:
(A) an image processing apparatus that comprises: (1) one or more processors, and (2) a memory that stores a program which, when executed by the one or more processors, causes the one or more processors to function as: (a) a calculation unit configured to calculate an evaluation value representing a condition of shading for an object region in an image; (b) a determination unit configured to determine, based on the evaluation value, if the degree of shading for an object region is necessary to be increased or decreased; (c) a setting unit configured to set a virtual light source based on the determination result of the determination unit; and (d) a correction unit configured to apply effects of virtual light irradiated by the virtual light source in the image; and
(B) an image capturing unit configured to acquire the image by shooting,
wherein the calculation unit calculates the evaluation value based on one or more of (a) contrast of the object region, (b) a luminance histogram of the object region in the image, (c) properties of a boundary of a shaded region of the object region, and (d) an area of a shaded region of the object region,
wherein the setting unit sets the virtual light source so that the virtual light illuminates a shaded region of the object region, in a case where it is determined by the determination unit that the shading needs to be decreased, and
wherein the setting unit sets the virtual light source so that illuminated areas in the object region due to environmental light and the virtual light overlap, in a case where it is determined by the determination unit that the shading needs to be increased.

19. A method of controlling an image processing apparatus, the method comprising:
calculating an evaluation value representing a condition of shading for an object region in an image;
determining, based on the evaluation value, if the degree of shading for an object region is necessary to be increased or decreased;
setting a virtual light source based on the determination result in the determining; and
applying effects of virtual light irradiated by the virtual light source in the image,
wherein in the calculating, the evaluation value is calculated based on one or more of (a) contrast of the object region, (b) a luminance histogram of the object region in the image, (c) properties of a boundary of a shaded region of the object region, and (d) an area of a shaded region of the object region,
wherein in the setting, the virtual light source is set so that the virtual light illuminates a shaded region of the object region, in a case where it is determined in the determining that the shading needs to be decreased, and
wherein in the setting, the virtual light source is set so that illuminated areas in the object region due to environmental light and the virtual light overlap, in a case where it is determined in the determining that the shading needs to be increased.

20. A non-transitory computer-readable storage medium that stores a program for causing a computer to function as an image processing apparatus comprising:
a calculation unit configured to calculate an evaluation value representing a condition of shading for an object region in an image;
a determination unit configured to determine, based on the evaluation value, if the degree of shading for an object region is necessary to be increased or decreased;
a setting unit configured to set a virtual light source based on the determination result of the determination unit; and
a correction unit configured to apply effects of virtual light irradiated by the virtual light source in the image,
wherein the calculation unit calculates the evaluation value based on one or more of (a) contrast of the object region, (b) a luminance histogram of the object region in the image, (c) properties of a boundary of a shaded region of the object region, and (d) an area of a shaded region of the object region,
wherein the setting unit sets the virtual light source so that the virtual light illuminates a shaded region of the object region, in a case where it is determined by the determination unit that the shading needs to be decreased, and
wherein the setting unit sets the virtual light source so that illuminated areas in the object region due to environmental light and the virtual light overlap, in a case where it is determined by the determination unit that the shading needs to be increased.

* * * * *